US010715043B2

(12) United States Patent
Samid

(10) Patent No.: US 10,715,043 B2
(45) Date of Patent: Jul. 14, 2020

(54) SINGLE INDUCTOR MULTIPLE OUTPUT POWER CONVERTER WITH OVERLOAD CONTROL

(71) Applicant: Dialog Semiconductor (UK) Limited, London (GB)

(72) Inventor: Lourans Samid, Untergruppenbach (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/373,804

(22) Filed: Apr. 3, 2019

(65) Prior Publication Data

US 2020/0021194 A1 Jan. 16, 2020

(30) Foreign Application Priority Data

Jul. 11, 2018 (DE) ........................ 10 2018 211 483

(51) Int. Cl.
*H02M 3/158* (2006.01)
*H02M 1/00* (2006.01)

(52) U.S. Cl.
CPC .... *H02M 3/1582* (2013.01); *H02M 2001/009* (2013.01)

(58) Field of Classification Search
CPC ............ H02M 3/00; H02M 3/02; H02M 3/04; H02M 3/10; H02M 3/145; H02M 3/155; H02M 3/156; H02M 3/1563; H02M 3/157; H02M 3/158; H02M 3/1582; H02M 3/1584; H02M 3/1588; H02M 3/33561; H02M 2001/009; H02M 2001/0009; H02M 2001/0012; H02M 2001/0016; H02M 2001/0019; H02M 2001/0025; H02M 2001/0032; H02M 2001/0083;

(Continued)

(56) References Cited

U.S. PATENT DOCUMENTS

2012/0169307 A1* 7/2012 Chen ..................... H02M 3/158 323/271
2013/0147457 A1* 6/2013 Kim ...................... H02M 3/158 323/311
2017/0366086 A1 12/2017 Calhoun et al.

OTHER PUBLICATIONS

German Office Action, File No. 10 2018 211 483.8, Applicant: Dialog Semiconductor (UK) Limited, dated Mar. 15, 2019, 7 pages and English language translation, 9 pages.

* cited by examiner

*Primary Examiner* — Thienvu V Tran
*Assistant Examiner* — Carlos O Rivera-Perez
(74) *Attorney, Agent, or Firm* — Saile Ackerman LLC; Stephen B. Ackerman

(57) ABSTRACT

A single inductor multiple output SIMO power converter and method are presented. The converter has a single inductor and at least two output terminals which are denoted as first output terminal and second output terminal. The SIMO power converter also has a first switching element and a second switching element. The first switching element is coupled between an output terminal of the inductor and the first output terminal of the SIMO power converter. The second switching element is coupled between the output terminal of the inductor and the second output terminal of the SIMO power converter. The SIMO power converter also has a control circuit to detect an overload condition at the first output terminal, and to generate control signals for controlling the switching of the first switching element and the second switching element based on the detected overload condition.

16 Claims, 14 Drawing Sheets

20 SIDO_BUCK 11 en en&a en&a Vref0- Vdrop Vref1- Vdrop a MUX 40 41 MUX V0 V1 42 43 44 SW0 SW1 0 1 45 46 47 SW00 SW11 480 490 48 49 V0 V1 13

(58) Field of Classification Search
CPC ... H02M 2001/0067; H02M 2001/008; H02M 2003/1566; H02M 2003/1586; H02M 1/32; H02M 1/325; H02M 1/36; H02M 1/4225; Y10T 307/25; Y10T 307/406; Y10T 307/438
USPC ....... 323/222–226, 247, 259, 265, 266, 267, 323/271–277, 280, 282–286, 351; 363/65, 74, 123, 124; 307/11, 29, 31, 34, 307/38–41
See application file for complete search history.

3

| a | b | c | En | |
|---|---|---|---|---|
| 0 | 0 | 0 | 0 | |
| 0 | 1 | 1 | 1 | V1 is overloaded |
| 1 | 0 | 1 | 1 | V0 is overloaded |
| 1 | 1 | 1 | 0 | V1 & V0 overloaded |

FIG. 3

| a | b | c | en |
| --- | --- | --- | --- |
| 0 | 1 | 1 | 1 |

7

| | | | Unit |
|---|---|---|---|
| Output voltage | V0=1.275 | V1=0.525 | V |
| Current | Io0=0.7->0.5 | Io1=0.7->2 | A |
| Vdrop | 10 | | mV |
| Hysteresis | +5 | -5 | mV |
| Ilimit | 1.6 | | A |

| c | En |
| --- | --- |
| 0 | 0 |
| 1 | 1 |

| | | | Unit |
| --- | --- | --- | --- |
| Output voltage | V0=1.275 | V1=0.525 | V |
| Current | Io0=0.7->0.5 | Io1=0.7->2 | A |
| I limit | 1.6 | | A |

FIG. 12

SINGLE INDUCTOR MULTIPLE OUTPUT POWER CONVERTER WITH OVERLOAD CONTROL

TECHNICAL FIELD

The present document relates to single inductor multiple output (SIMO) power converters, such as e.g. single inductor dual output (SIDO) power converters. In particular, the present document relates to SIMO power converters with overload detection, wherein said SIMO power converters are configured for robust operation in case of a detected overload condition.

BACKGROUND

SIMO power converters are promising candidates for power management integrated circuits (PMICs) because only one inductor is used to supply multiple outputs quasi simultaneously. One case of such SIMO converter type is the SIDO converter, the single inductor dual output type. The present invention may be practiced with a plurality of DC-DC power converter designs, such as—but not limited to—at least one of a group including multi-output DC-DC up (boost) converters, multi-output DC-DC down (buck) converters, multi-output DC-DC up/down (buck-boost) converters, multi-output DC-DC inverting converters, multi-output DC-DC converters with positive and negative output, and multi-output DC-DC up/down converters with multiple positive and negative outputs. Limitations in the chosen number of outputs will occur depending on performance requirements such as load regulation, or maximum load and un-balance range of loads throughout the various outputs.

Usually, the system current limit is the sum of the individual output currents. One topic of interest is the handling of output overload situations, i.e. situations in which the sum of the currents drawn from the outputs of the SIMO power converter exceeds the system current limit. In prior art systems, such output overload situations cause the severe voltage drops not only at the output of the SIMO power converter which is actually overloaded. In a SIDO power converter, for instance, both output voltages at both outputs may drop significantly although only one output is overloaded. As a consequence, also operation of the supplied device at the non-overloaded output of the SIDO may be interrupted as long as the overload condition persists. This problem is caused by regulation schemes which convey the common coil current to the individual outputs. This function works well under normal conditions, however, in case of an overload of the system, these schemes tend to affect the multiple outputs adversely.

Typically, conventional SIMO power converters comprise individual switching elements for each output, wherein said switching elements may form part of a switching matrix 12, as can be seen e.g. in FIG. 1. Regular output matrix control schemes typically regulate on and off times of said switching elements in order to control the values of the required (average) output currents. However, in case of an overload at one output, the power converter may transfer the current of the energized coil completely to this overloaded output, and the voltages at the other outputs may drop down as well if they have an output load to deliver.

SUMMARY

The present document addresses the above mentioned technical problems. In particular, the present document addresses the technical problem of providing a SIMO power converter which is robust in case of the described overload conditions.

According to an aspect, a single inductor multiple output SIMO power converter may comprise an inductor, a first output terminal and a second output terminal. To be more specific, the SIMO power converter may comprise only one inductor. The SIMO power converter may comprise a first switching element and a second switching element, wherein the first switching element is coupled between an output terminal of the inductor and the first output terminal of the SIMO power converter, and the second switching element is coupled between the output terminal of the inductor and the second output terminal of the SIMO power converter. The SIMO power converter may further comprise a control circuit configured to detect an overload condition at the first output terminal, and to generate control signals for controlling the switching of the first switching element and the second switching element based on the detected overload condition.

Each of the two switching elements may be implemented with any suitable device, such as, for example, a metal-oxide-semiconductor field effect transistor (MOSFET), an insulated-gate bipolar transistor (IGBT), a MOS-gated thyristor, or other suitable power device. Each switching element may have a gate to which a respective driving voltage or control signal may be applied to turn the switching element on or off.

The control circuit may be configured to detect the overload condition at the first output terminal if a first output current at the first output terminal is larger than a second output current at the second output terminal, and if a sum of the first output current and the second output current exceeds a maximum current limit of the SIMO power converter. Although the following description is dedicated to overload conditions at the first output terminal, those skilled in the art will readily understand that the present invention also covers overload conditions at the second output terminal, in which case—while the maximum current limit is exceeded—the second output current at the second output terminal is larger than the first output current at the first output terminal. Moreover, the SIMO power converter may comprise more than 2 output terminals and the described invention is not limited to the case of a SIDO.

The claimed SIMO power converter makes it possible that, by detecting the overload condition and generating the control signals accordingly, the output voltages at the non-overloaded output terminal(s) may be protected from dropping down e.g. by disconnecting the overloaded output terminals from the inductor for well-defined time intervals. In this way, robust system operation is enabled in case of an overload fault condition.

Specifically, the control circuit may be configured to, upon detecting said overload condition at the first output terminal, open the first switching element and to close the second switching element by generating corresponding control signals. By opening the first switching element, the first output terminal is disconnected from the inductor, whereas a conductive path is established between the second, non-overloaded output terminal and the inductor, at least for a limited time interval. The control circuit may comprise a comparator configured to compare a voltage at the second output terminal with a threshold voltage, and the control circuit may be configured to, if the voltage at the second output terminal exceeds the threshold voltage, to close the first switching element (again) and to open the second switching element (again) by generating corresponding control signals. At this, the threshold voltage may be chosen to equal a difference between a reference voltage minus a pre-determined voltage drop, wherein said reference voltage may represent a target voltage value of the voltage regulation of the SIMO power converter for this first output terminal. In other words, the above-described configuration of the control circuit makes it possible that—during well-defined time intervals—the output terminals of the power converter which are not overloaded will be served exclusively until the output voltage at the non-overloaded output terminal has recovered and is above said threshold voltage.

The other way round, the control circuit may be configured to, if the voltage at the second output terminal falls below the threshold voltage, to open the first switching element (again) and to close the second switching element (again) by generating corresponding control signals. For example, the comparator may comprise a comparator circuit with hysteresis for performing said comparison between the voltage at the second output terminal and the threshold voltage. The comparator circuit with hysteresis may be e.g. a Schmitt trigger implemented by applying positive feedback to the noninverting input of a comparator or a differential amplifier.

In general, on the one hand, the control circuit may be configured to, when the overload condition is detected at the first output terminal, to increase an average output current through the second switching element to the second output terminal by generating corresponding control signals. On the other hand, the control circuit may be configured to, when the overload condition is detected at the first output terminal, to decrease an average output current through the first switching element to the first output terminal by generating corresponding control signals. For example, the control circuit may be configured to receive primary control signals which are generated by a conventional SIMO power converter for controlling said switching elements during times of no overload, and the control circuit may be configured to overwrite said primary control signals in times of an overload by generating appropriate control signal as described above. Compared to the primary control signals, which do not take into account said overload but are only configured to control the current ratios at the output terminals, the control signals generated by the claimed control circuit in overload situations result in longer on-times of the second switching element (and shorter on-times of the first switching element) and therefore in an increased average output current at the second output terminal in comparison to currents resulting from conventional control schemes.

The control circuit may further comprise a multiplexer coupled to a first input of the comparator, wherein the multiplexer is configured to connect the second output terminal to the first input of the comparator in case the overload condition is detected at the first output terminal, or to connect the first output terminal to the first input of the comparator in case an overload condition is detected at the second output terminal, and wherein the threshold voltage is applied to a second input of the comparator. Moreover, the control circuit may comprise a second multiplexer connected to the second input of the comparator for switching between two different threshold voltages, i.e. one threshold voltage for comparison with the voltage at the first output terminal and another threshold voltage for comparison with the voltage at the second output terminal.

The usage of the described multiplexer provides the advantage that only one comparator is required for selectively comparing both output voltages against corresponding the respective threshold voltages. Put in a different way, the control circuit may perform a comparison of either (a) the output voltage at the first output terminal against a first threshold voltage or of (b) the output voltage at the second output terminal against a second threshold voltage. Alternatively, a second comparator may be used as well.

The control circuit may be configured to generate a first control signal for controlling the switching of the first switching element and to generate a second control signal for controlling the switching of the second switching element, wherein said first control signal and the second control signal are binary signals, and wherein the first control signal is an inverted version of the second control signal.

Also, the SIMO power converter may further comprise a modulator and a half bridge (also known as power stage) with a high side switching element and a low side switching element, wherein the modulator is coupled to the half bridge and configured to control the switching behavior of the high side switching element and the low side switching element based on a voltage at the first output terminal and/or a voltage at the second output terminal. Again, the high-side switching element and the low-side switching element may be implemented with any suitable device, such as, for example, a MOSFET, an IGBT, a MOS-gated thyristor, or other suitable power device. The high-side switching element and the low-side switching element may have gates to which a respective driving voltages or control signals may be applied to turn the switching elements on or off.

Specifically, the control circuit may be configured to control the switching of the first switching element and the second switching element independently of the modulator controlling the switching behavior of the high side switching element and the low side switching element. As an advantage, the presented overload control method may be applied to a plurality of different power converter architectures such as e.g. DC-DC power converters operated in current mode control or voltage mode control.

In addition, the modulator may be configured to control the switching of the first switching element and the second switching element by generated said primary control signals, and said primary control signals may be directly applied to the first switching element and the second switching element when no overload is detected. When an overload is detected, the control circuit may be configured to control the switching of the first switching element and the second switching element by generating said control signals which replace said primary control signals generated by the modulator.

According to another aspect, a method of operating a single inductor multiple output SIMO power converter is presented, wherein said SIMO power converter comprises an inductor, a first output terminal, a second output terminal, a first switching element, a second switching element, and a control circuit. The method comprises coupling the first switching element between an output terminal of the inductor and the first output terminal of the SIMO power converter, and coupling the second switching element between the output terminal of the inductor and the second output terminal of the SIMO power converter. The control circuit detects an overload condition at the first output terminal, and generates, based on the detected overload condition, control signals for controlling the switching of the first switching element and the second switching element.

The method may further comprise, upon detecting said overload condition at the first output terminal, opening the first switching element by generating corresponding control signals. At the same time, upon detecting said overload condition at the first output terminal, the second switching element may be closed by the control circuit by generating corresponding control signals.

The method may further comprise comparing, by a comparator of the control circuit, a voltage at the second output terminal with a threshold voltage. If the voltage at the second output terminal exceeds the threshold voltage, the first switching element may be closed and the second switching element may be opened by generating corresponding control signals.

The method may further comprise providing a multiplexer coupled to a first input of the comparator, connecting, by said multiplexer, the second output terminal to the first input of the comparator in case the overload condition is detected at the first output terminal. The method may also comprise connecting the first output terminal to the first input of the comparator in case an overload condition is detected at the second output terminal, and applying the threshold voltage to a second input of the comparator.

The method may further comprise detecting, by the control circuit, the overload condition at the first output terminal if a first output current at the first output terminal is larger than a second output current at the second output terminal, and if a sum of the first output current and the second output current exceeds a maximum current limit of the SIMO power converter.

The method may further comprise generating, by the control circuit, a first control signal for controlling the switching of the first switching element. A second control signal may be generated for controlling the switching of the second switching element, wherein said first control signal and the second control signal are binary signals, and wherein the first control signal is an inverted version of the second control signal.

The method may further comprise providing, within the SIMO power converter, a modulator and a half bridge with a high side switching element and a low side switching element. The modulator may be coupled to the half bridge and the modulator may control the switching behavior of the high side switching element and the low side switching element based on a voltage at the first output terminal and/or a voltage at the second output terminal. In fact, the switching of the first switching element and the second switching element may be controlled independently of the switching behavior of the high side switching element and the low side switching element. In addition, the method may further comprise controlling, by the modulator, the switching of the first switching element and the second switching element when no overload is detected, and controlling, by the control circuit, the switching of the first switching element and the second switching element when the overload is detected.

Overall, the method may further comprise increasing, when the overload condition is detected at the first output terminal, an average output current through the second switching element by generating corresponding control signals. As such, the method may further comprise decreasing, when the overload condition is detected at the first output terminal, an average output current through the first switching element by generating corresponding control signals.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein

FIG. 3 shows a signalling schema for a SIDO buck converter;

FIG. 7 illustrates simulation parameters;

FIG. 11 shows a signalling schema for a SIDO buck converter;

FIG. 12 illustrates simulation parameters;

DESCRIPTION

Figure 1:
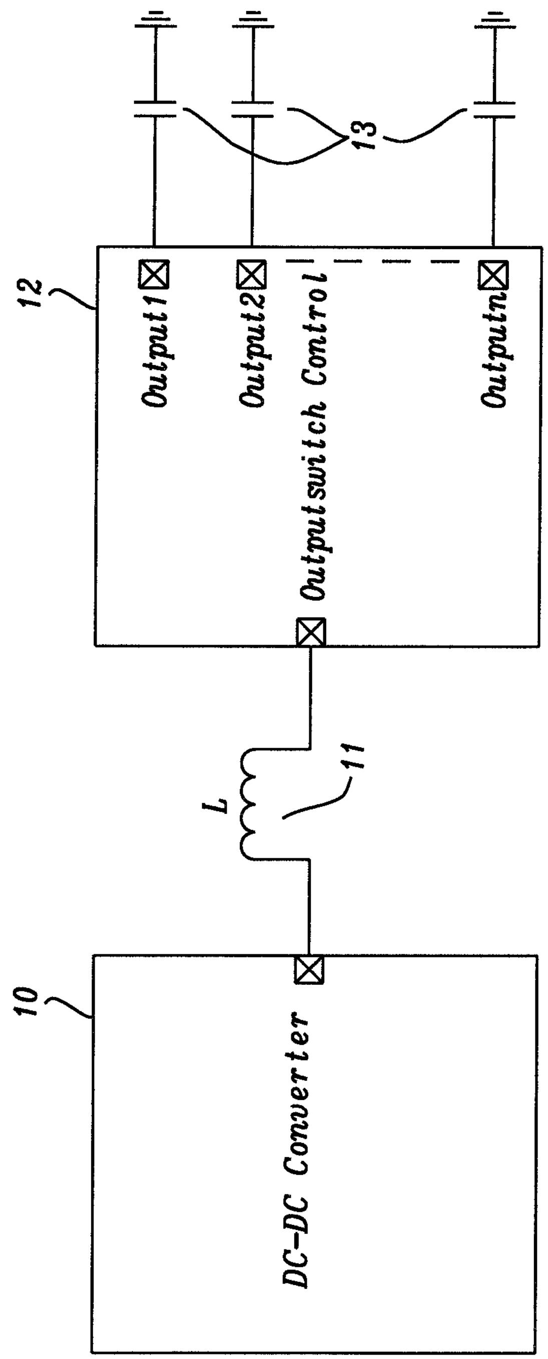
FIG. 1 shows an overall architecture of a SIMO power converter.

FIG. 1 shows the overall architecture of a SIMO power converter including a DC-DC converter 10, an inductor 11, and an output switching matrix 12 configured to assign the inductor current to a plurality of output terminals 1 to n. As can be seen in FIG. 1, a plurality of output capacitors 13 may be connected to every output terminal of the output switching matrix 12, respectively.

Figure 2:
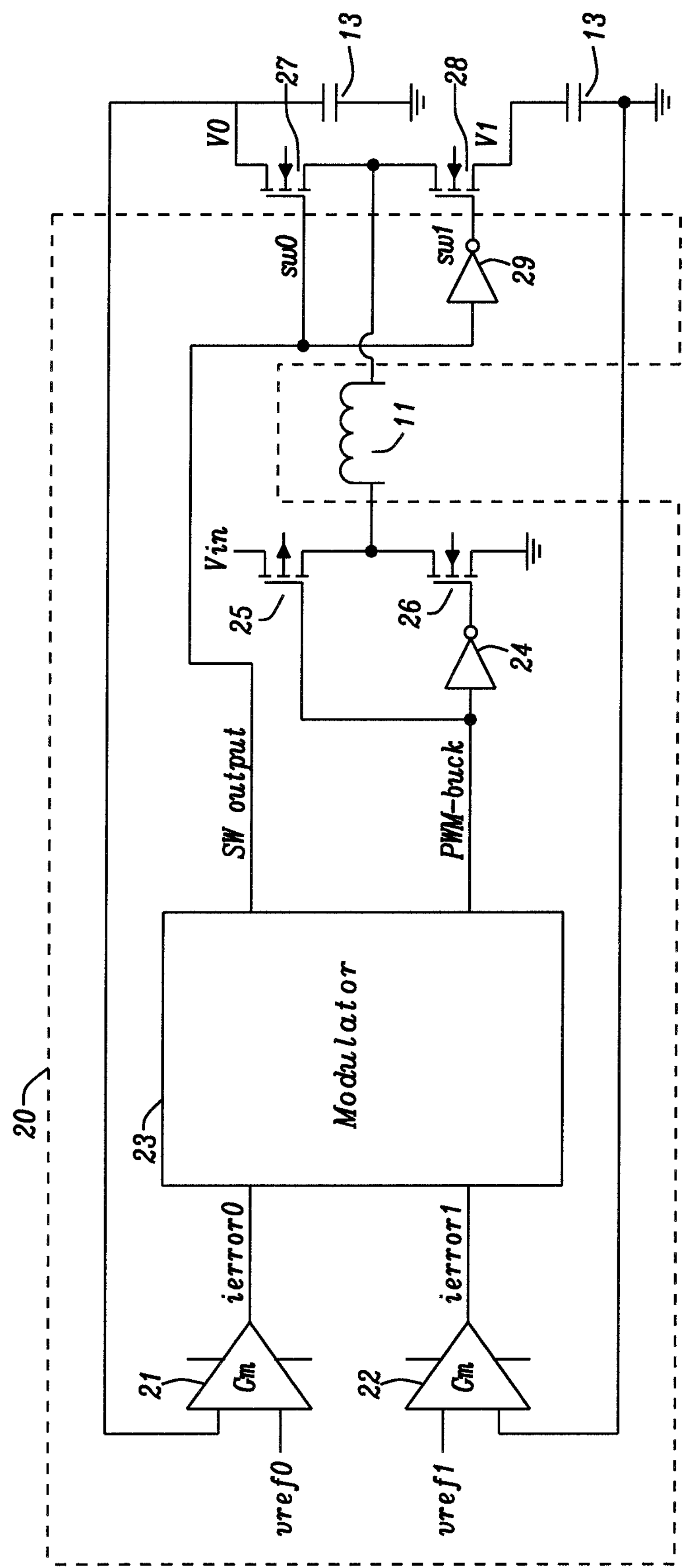
FIG. 2 shows a circuit diagram of a SIDO buck converter.

In the following description, the invention will be described, without loss of generality, using an exemplary SIDO buck converter. A SIDO buck converter which is known from the state of the art is depicted in FIG. 2. It includes two Gm transconductance stages 21, 22, a modulator 23, a buck half bridge comprising a high-side switch 25 and a low-side switch 26. The power converter further comprises an inductor 11, a first switching element 27, and a second switching element 28. The first switching element 7 is coupled between an output terminal of the inductor 11 and the first output terminal of the SIDO power converter, and the second switching element 28 is coupled between the output terminal of the inductor 11 and the second output terminal of the SIDO power converter. As depicted in FIG. 2 using two inverter circuits 24 and 29, a first control signal for controlling the high-side switch 25 is an inverted version of a second control signal for controlling the low-side switch 26. Similarly, a control signal SWO for controlling the first switching element 27 is an inverted version of a control signal SW1 for controlling the second switching element 28. In the following description, the control signals SWO and SW1 may also be denoted as primary control signals. A core 20 of the SIDO buck converter in FIG. 2 consists of those components displayed within the area indicated by the dashed line, i.e. the core 20 of the SIDO buck converter comprises the two Gm transconductance stages 21, 22, the modulator 23, the half bridge, and the inverter circuits 24 and 29.

In case of a current overload at one of the two output terminals of the SIDO buck converter in FIG. 2, the coil current of inductor 11 may go completely through the overloaded output, thus both output voltages may drop out and power supply to the devices connected to the output terminals may be insufficient. The idea is now to detect which output of the SIDO buck converter is overloaded and to avoid a dropout of the non-overloaded output. Table 3 of FIG. 3 shows a signalling schema for the SIDO buck converter illustrated in FIG. 2. When the SIDO buck converter is overloaded, the indicator c will be equal to 1. Indicators a and b indicate which of the both outputs is overloaded. The described overload protection starts when the enable signal en is equal to 1. In Table 3, indicator a is equal to 1 when the first output terminal is overloaded, and indicator b is equal to 1 when the second output terminal is overloaded, and indicator c is equal to 1 means the SIDO buck converter as such is overloaded, e.g. because the sum of the two output currents is larger than the maximum current limit of the SIDO buck converter.

Figure 4:
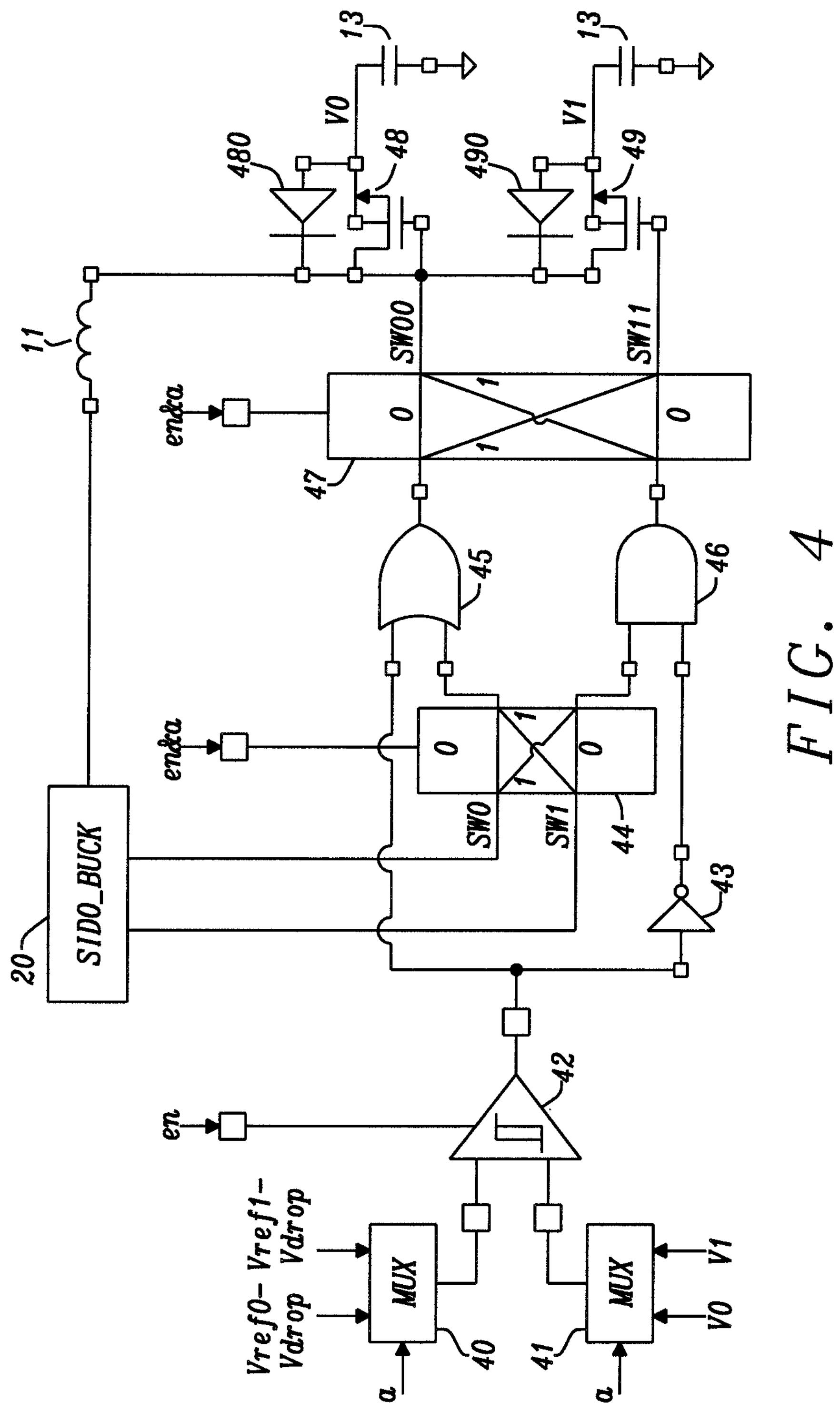
FIG. 4 shows an exemplary circuit diagram of a control circuit for a SIDO buck converter.

FIG. 4 shows an exemplary circuit diagram of a control circuit which is coupled between a core 20 of a SIDO buck converter and switching elements 48 and 49. The core 20 may be e.g. implemented as shown in FIG. 2. More specifically, the displayed exemplary control circuit is configured to generated control signals SW00 and SW11 for controlling switching elements 48 and 49 based on the primary control signals SWO and SW1 provided by the core 20.

In FIG. 4, a first body diode 480 of the first switching element 48 is illustrated. The first body diode 480 is connected in parallel to the first switching element 48. Analogously, a second body diode 490 of the second switching element 49 is illustrated. The second body diode 490 is connected in parallel to the second switching element 49.

The depicted exemplary control circuit comprises a comparator 42 configured to compare, dependent on the determined values of the indicators a and/or b, and enabled by enable signal en, one of the output voltages V0 and V1 with one of the threshold voltages (Vref0−Vdrop) or (Vref1−Vdrop), respectively. At this, the first threshold voltage (Vref0−Vdrop) is given as the difference between a reference voltage Vref0 for the first output terminal and a voltage drop Vdrop. For example, the voltage drop Vdrop in a current mode buck converter may be equal to Iout/Gm. The second threshold voltage (Vref1−Vdrop) is given as the difference between a reference voltage Vref1 for the second output terminal and the voltage drop Vdrop. With the help of the illustrated multiplexers 40 and 41 which are connected to the inputs of comparator 42, the correct combination of signals is applied to the comparator 42 according to indicators a and/or b. The illustrated circuit shows the advantage that both output voltages may be monitored selectively using only one comparator. The output of comparator 42 is connected directly to an input of an OR-gate 45 such that the first switching element 48 is turned on whenever the second output terminal is overloaded and the first output voltage VO is smaller than the threshold voltages (Vref0−Vdrop). Alternatively, when taking into account a hysteresis of comparator 42, the first switching element 48 is turned on when the second output terminal is overloaded and the first output voltage VO is smaller than the threshold voltages (Vref0−Vdrop−Vhyst), wherein Vhyst denotes the hysteresis voltage of comparator 42. The other way round, the first switching element 48 is turned off when the second output terminal is overloaded and the first output voltage VO is greater than the threshold voltages (Vref0−Vdrop+Vhyst). Furthermore, the output of the comparator 42 is connected indirectly via inverter 43 with an input of AND-gate 46.

The exemplary control circuit further comprises a first multiway switch 44 which connects control signal SWO to the second input of OR-gate 45 and control signal SW1 to the second input of AND-gate 46 if the overload protection is enabled (en=1) and the first output is overloaded (a=1). When the overload protection is enabled (en=1) and the second output is overloaded (a=0, or b=1), control signal SW1 is connected to the second input of OR-gate 45 and control signal SW0 is connected to the second input of AND-gate 46. The exemplary control circuit further comprises a second multiway switch 47 which connects the output of the OR-gate 45 to a gate of the first switching element 48 and the output of the AND-gate 46 to a gate of the second switching element 49 if the overload protection is enabled (en=1) and the first output is overloaded (a=1). When the overload protection is enabled (en=1) and the second output is overloaded (a=0, or b=1), the output of the OR-gate 45 is connected to the gate of the second switching element 49 and the output of the AND-gate 46 is connected to the gate of the first switching element 48. The usage of the first multiway switch 44 in combination with the second multiway switch 47 makes it possible to use only one AND-gate and one OR-gate in the control circuitry, and to selectively route the primary control signal SWO and SW1 through said multiway switches as needed, i.e. depending on which output terminal is overloaded.

Figure 5:
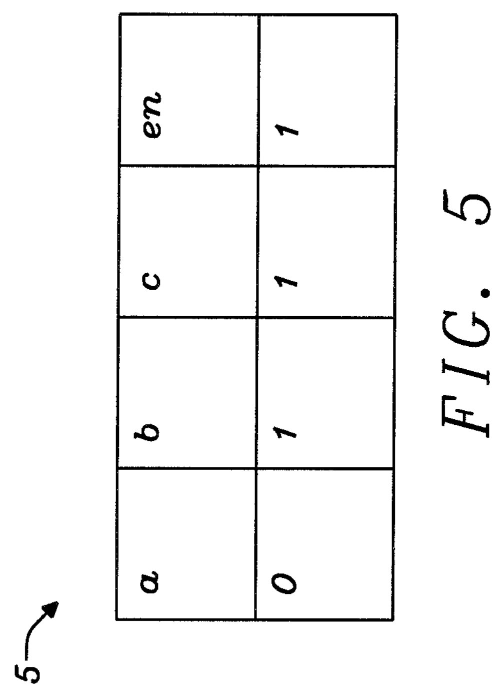
FIG. 5 shows a table with an exemplary signalling schema.
Figure 6:
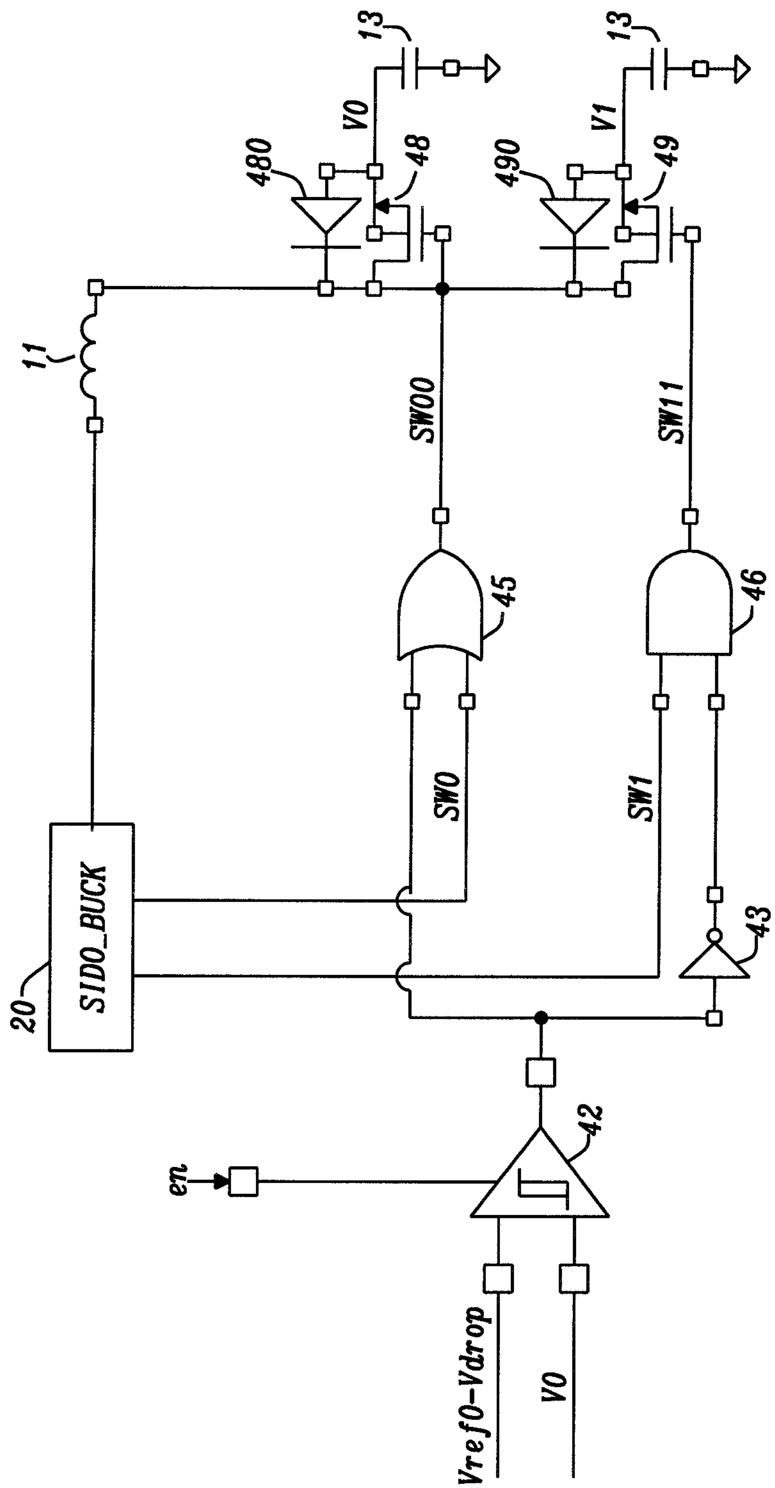
FIG. 6 shows a simplified circuit diagram of a control circuit for a SIDO buck converter.
Figure 8:
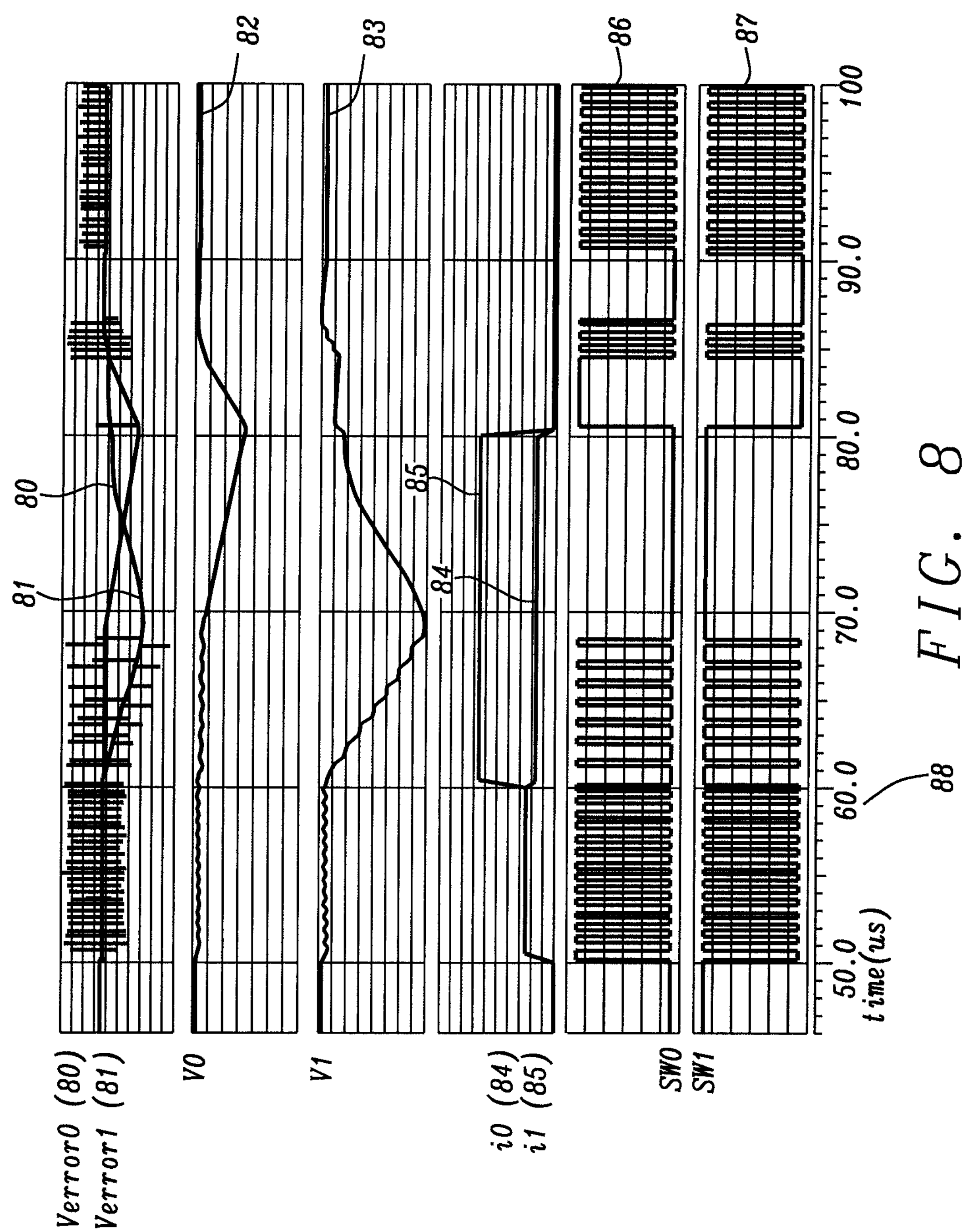
FIG. 8 shows simulation results for a SIDO buck converter without overload protection.
Figure 9:
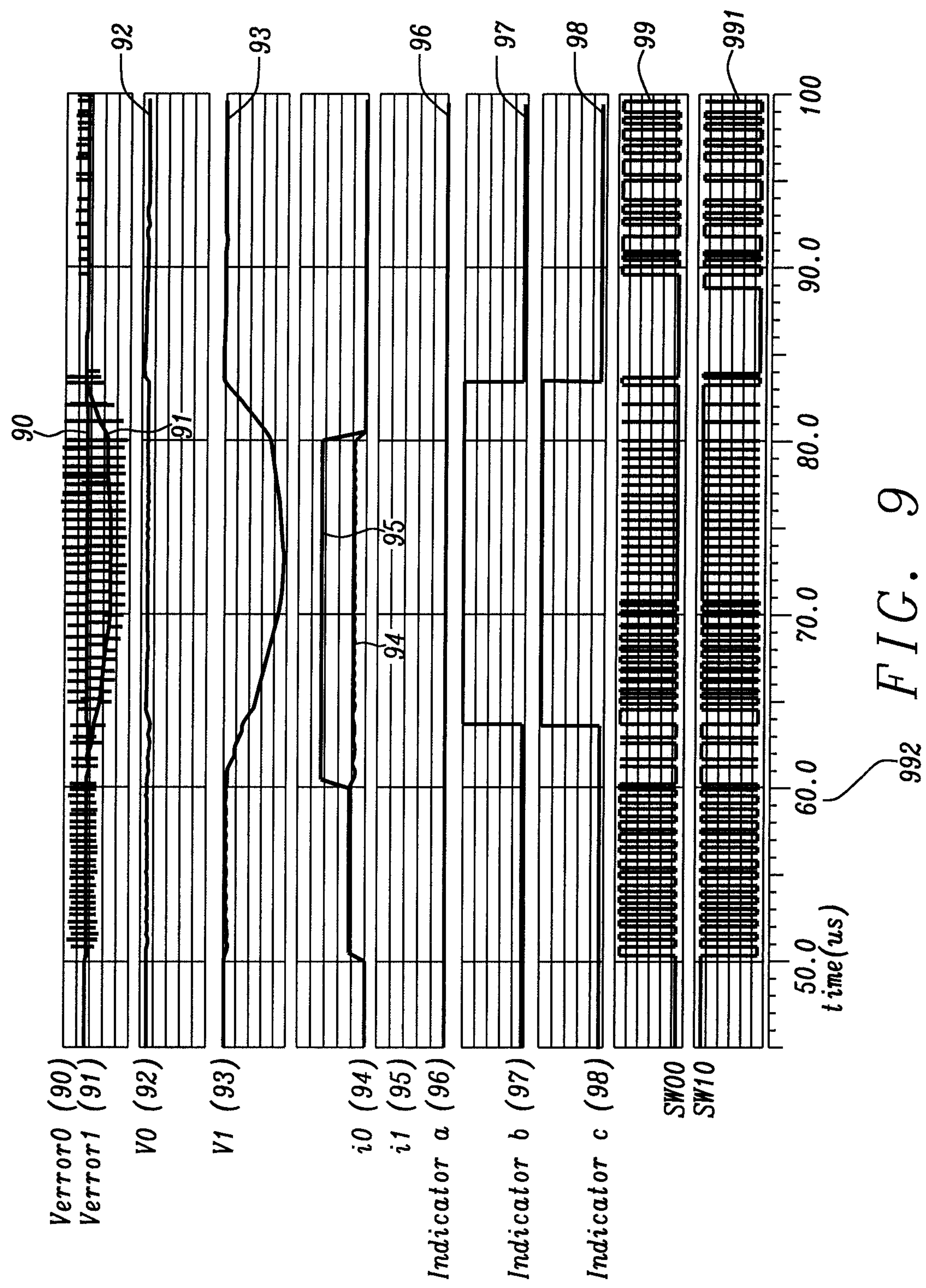
FIG. 9 shows simulation results for a SIDO buck converter with overload protection.

The asynchronous control mechanism implemented by the control circuit in FIG. 4 is further explained in FIGS. 5 to 9. Table 5 in FIG. 5 shows a signalling schema which is detected in case the second output is overloaded and the first output is not overloaded. In this scenario, the circuit displayed in FIG. 4 can be simplified as shown in FIG. 6. Table 7 in FIG. 7 illustrates the simulation parameters used for simulation results displayed in FIGS. 8 and 9, wherein FIG. 8 shows simulation results for the circuit in FIG. 2 without overload control, and FIG. 9 shows simulation results for the improved circuit in FIG. 6 with overload control.

In FIG. 8, signal 80 illustrates the error voltage Verror0, which is given by VO−Vref0, i.e. the difference between the first output voltage minus the first reference voltage. Signal 81 illustrates the error voltage Verror1, which is given by V1−Vref1, i.e. the difference between the second output voltage minus the second reference voltage. Signal 82 illustrates the first output voltage V0, and signal 83 illustrates the second output voltage V1. Signal 84 illustrates the first output current i0, and signal 85 illustrates the second output current i1. Signals 86 and 87 illustrate control signals SW0 and SW1, respectively.

At time 88, the second output terminal is overloaded, resulting in a quick and substantial drop of the second output voltage (signal 83) and as well as a delayed (but nevertheless substantial) decrease of the first output voltage (signal 82). The overload at time 88 is simulated by increasing the second output current from 0.7 A to 2 A while reducing the first output current from 0.7 A to 0.5 (compare Table 7).

In FIG. 9, the described control circuit is applied for overload protection. Signal 90 illustrates the error voltage Verror0, which is given by VO−Vref0, i.e. the difference between the first output voltage minus the first reference voltage. Signal 91 illustrates the error voltage Verror1, which is given by V1−Vref1, i.e. the difference between the second output voltage minus the second reference voltage. Signal 92 illustrates the first output voltage V0, which is fairly stable although an overload occurs at the second output terminal at time 992, and signal 93 illustrates the second output voltage V1. Signal 94 illustrates the first output current i0, and signal 95 illustrates the second output current i1. Signal 96 shows indicator a, signal 97 shows indicator b, and signal 98 shows indicator c. Signals 99 and 991 illustrate control signals SW00 and SW10, respectively, wherein control signals SW00 and SW10 are generated by the exemplary control circuit of FIG. 4.

The simulation results of FIG. 9 in comparison to the simulation results of FIG. 8 illustrate the advantage of the described control circuit. By reducing the mean time the overloaded output terminal is coupled to the inductor 11, and simultaneously increasing the mean time the non-overloaded output terminal is coupled to the inductor 11, a dropout of the voltage at the non-overloaded output terminal can be avoided.

Figure 10:
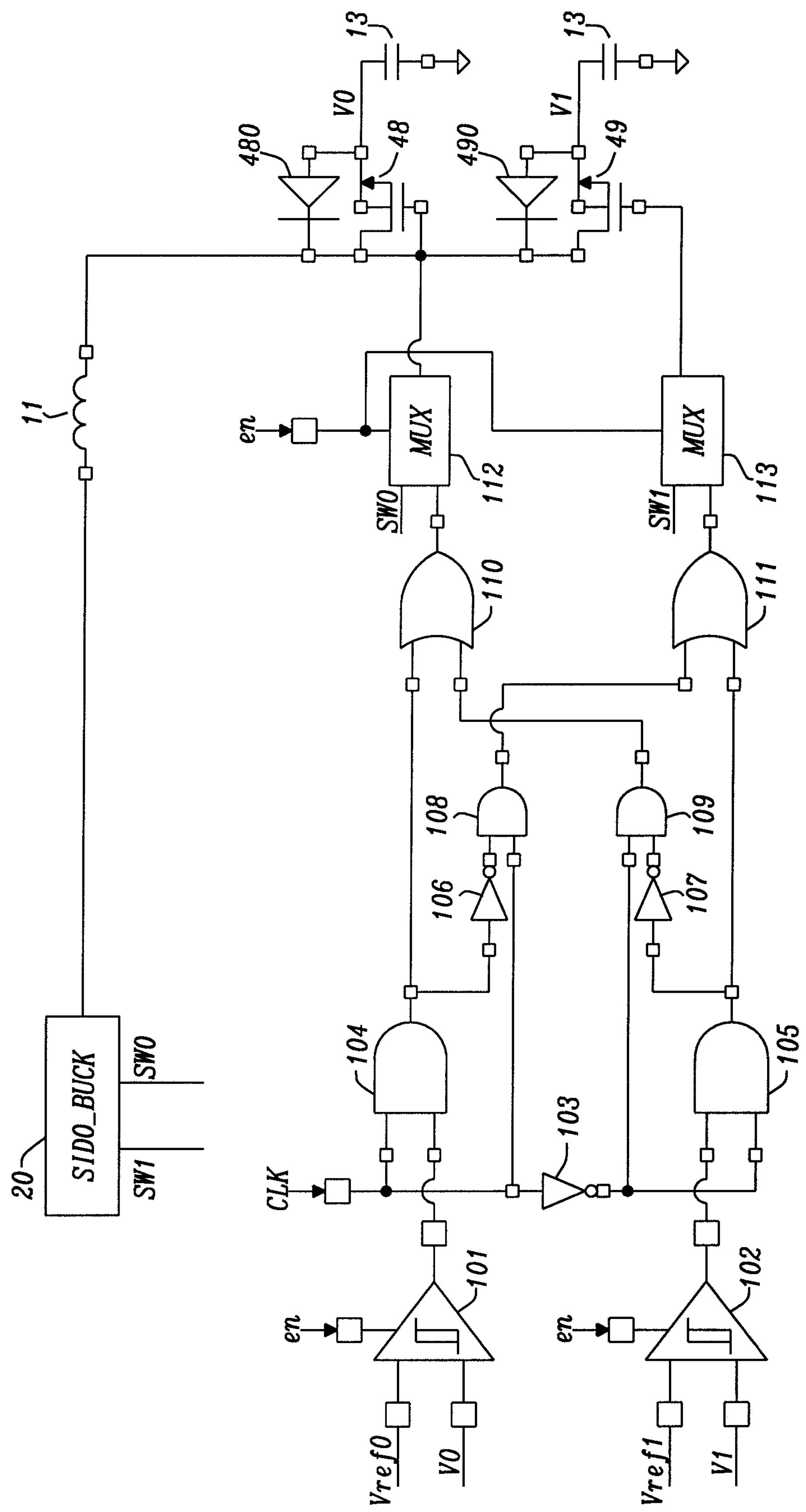
FIG. 10 shows an exemplary circuit diagram of an alternative control circuit for a SIDO buck converter.

FIG. 10 shows an exemplary circuit diagram of an alternative control circuit for a SIDO buck converter. In this example, a synchronous control circuit is used. The synchronous control circuit comprises two overvoltage comparators 101, 102 for comparing the output voltages against respective reference voltages. A clock signal CLK is applied to AND-gate 104 and an inverted version of clock signal CLK is applied to AND-gate 105. The synchronous control circuit further comprises AND-gates 108 and 109, inverters 103, 106, and 107, and OR-gates 110 and 111. In case the overload protection is enabled, the output of OR-gate 110 is coupled via multiplexer 112 to a gate of the first switching element 48. Otherwise, primary control signal SWO is used to control the first switching element 48. On the other hand, if the overload protection is enabled, the output of OR-gate 111 is coupled via multiplexer 113 to a gate of the second switching element 49. Otherwise, primary control signal SW1 is used to control the second switching element 49.

For example, the overload control can be realized by using the clock divided by 2 to prevent the dropout of non-overload output by using a 50-50% pulse width control signal as a switching control. Depending on the design specification, the control signal pulse width may be varied (i.e. between 0 to 100%). The design of FIG. 10 shows the advantage that—compared to the design in FIG. 4—indicators a and b indicating which output terminal is actually overloaded are not required.

The idea is to switch between the both outputs synchronic with (50-50%) pulse signal. In this case, the non-overloaded output voltage will have enough current to prevent the dropout until the overvoltage comparator indicates overvoltage, the switch of the output voltage V0 will be switched off and the switch of output voltage V1 will be switched on. In the illustrated example, two comparators are needed to avoid overvoltage at output voltages V0 and V1. The system overload signal c is needed to start the overload control.

Figure 13:
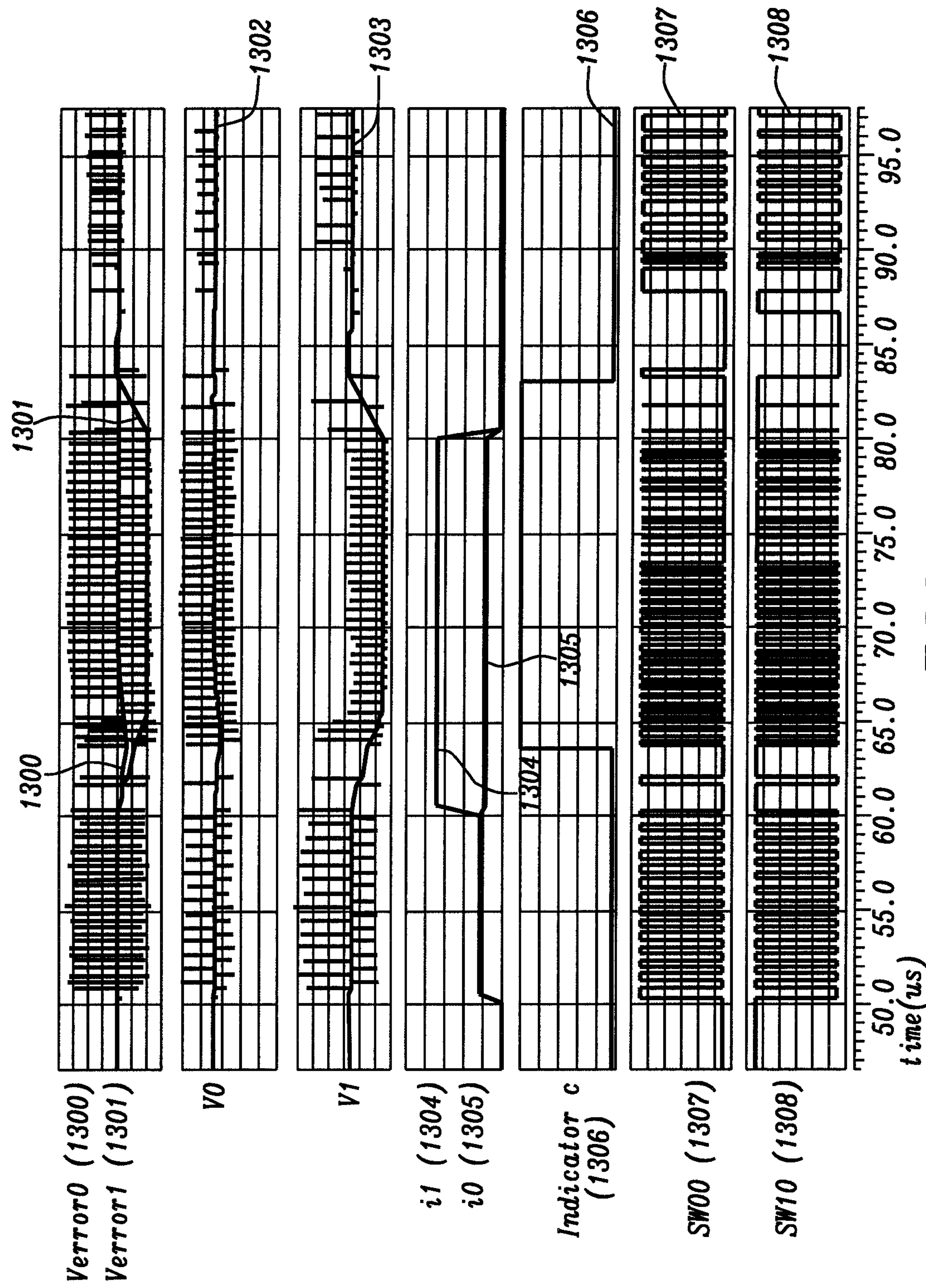
FIG. 13 shows simulation results for a SIDO buck converter with overload protection.

The synchron control mechanism implemented by the control circuit in FIG. 10 is further explained in FIGS. 11 to 15. Table 1100 in FIG. 11 shows a signalling schema, and Table 1200 in FIG. 12 illustrates the simulation parameters used for simulation results displayed in FIG. 13, FIG. 13 shows simulation results for the circuit in FIG. 10 with synchron overload control.

In FIG. 13, the described control circuit is applied for overload protection. Signal 1300 illustrates the error voltage Verror0, which is given by VO−Vref0, i.e. the difference between the first output voltage minus the first reference voltage. Signal 1301 illustrates the error voltage Verror1, which is given by V1−Vref1, i.e. the difference between the second output voltage minus the second reference voltage. Signal 1302 illustrates the first output voltage V0, and signal 1303 illustrates the second output voltage V1. Signal 1305 illustrates the first output current i0, and signal 1304 illustrates the second output current i1. Signal 1306 shows indicator c. Signals 1307 and 1308 illustrate control signals SW00 and SW10, respectively, wherein control signals SW00 and SW10 are generated by the exemplary control circuit of FIG. 10. Again, a dropout of the voltage at the first output terminal is successfully avoided.

Figure 14:
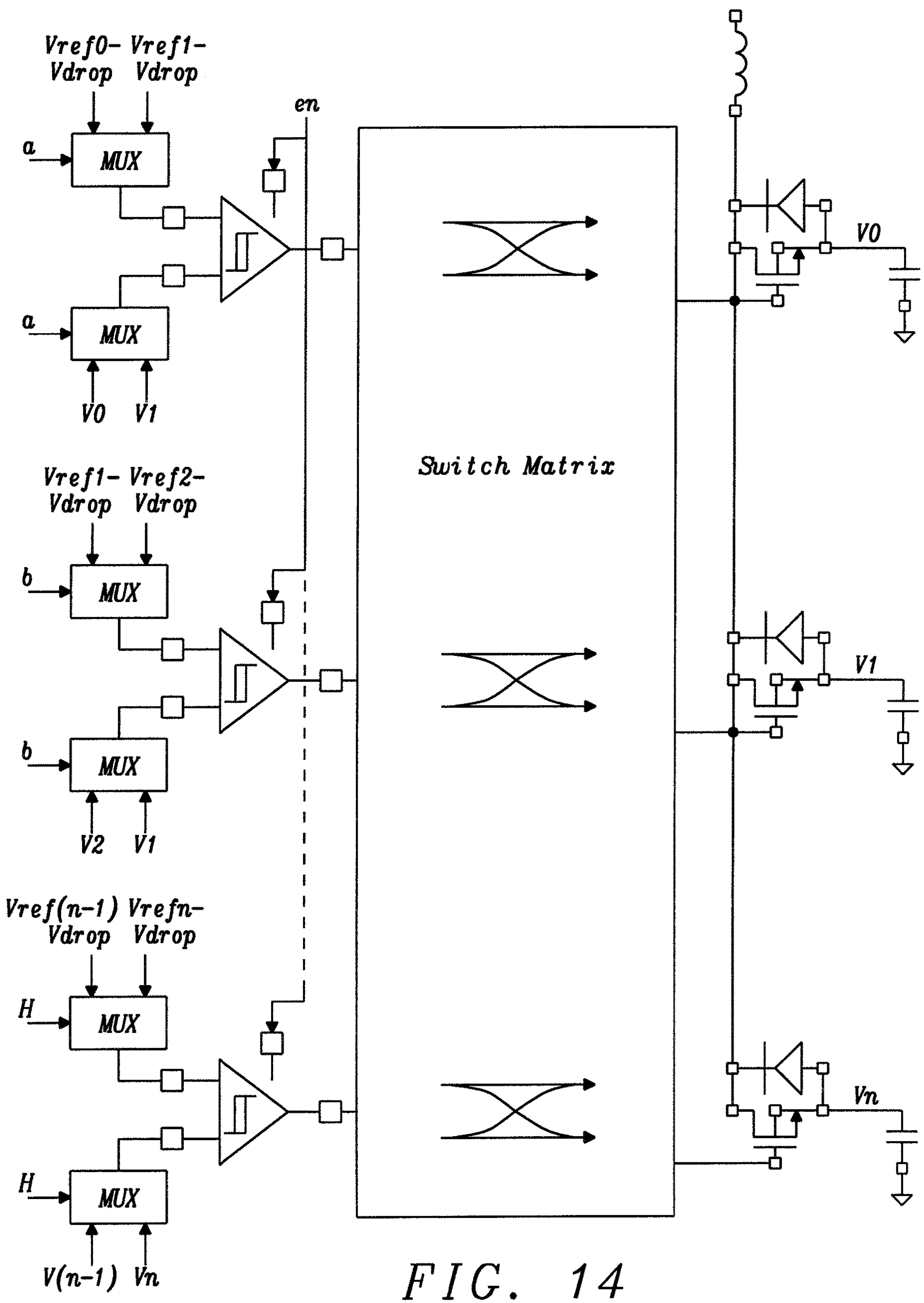
FIG. 14 shows an exemplary circuit diagram of a SIMO buck converter.
Figure 15:
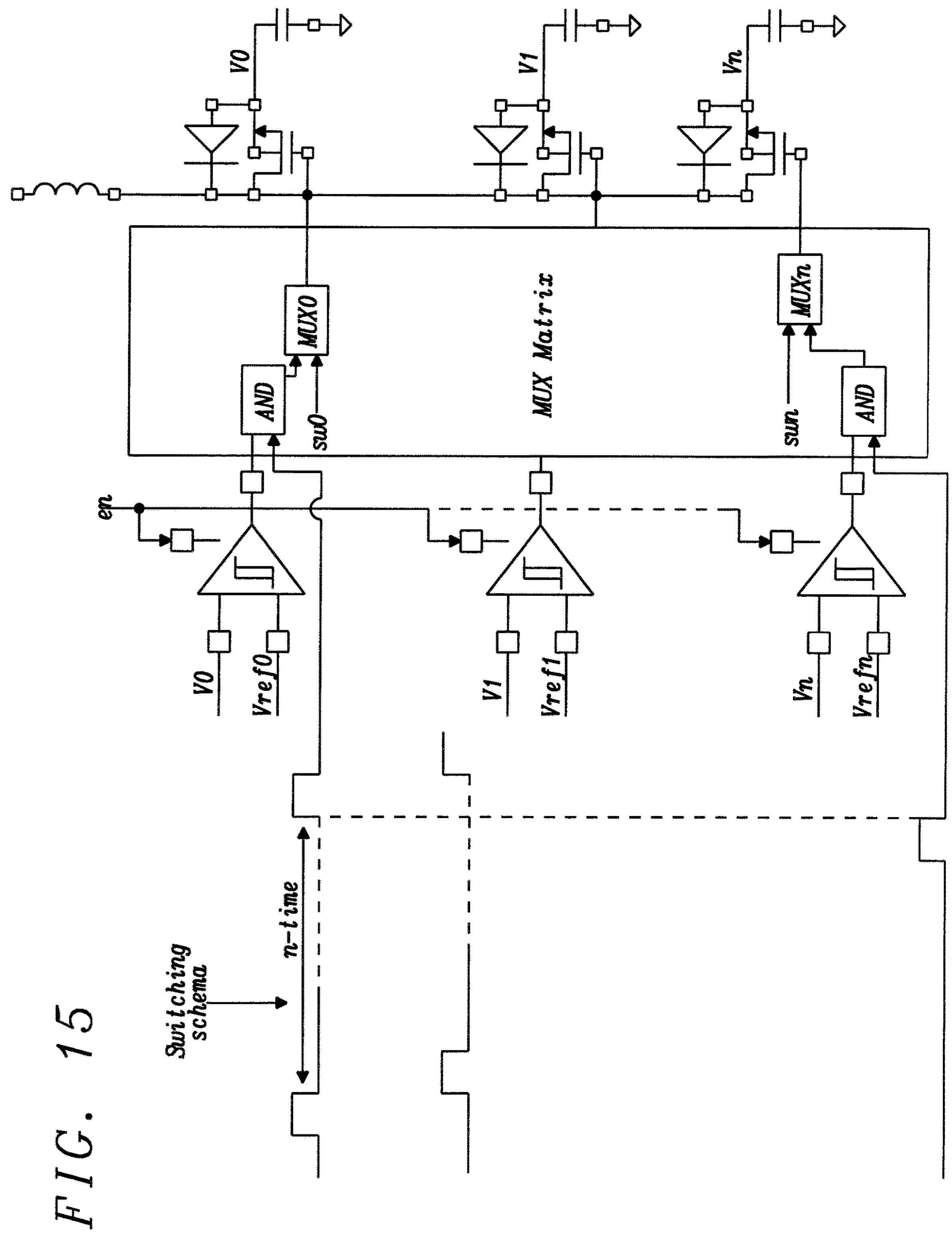
FIG. 15 shows another exemplary circuit diagram of a SIMO buck converter.

Finally, FIG. 14 shows an exemplary circuit diagram of a SIMO buck converter which is an extension of the circuit in FIG. 4 which accounts for n output terminals. Similarly, FIG. 15 shows an exemplary circuit diagram of a SIMO buck converter which is an extension of the circuit in FIG. 10 which accounts for n output terminals.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A single inductor multiple output, SIMO, power converter comprising an inductor;

a first output terminal and a second output terminal;

a first switching element and a second switching element, wherein the first switching element is coupled between an output terminal of the inductor and the first output terminal of the SIMO power converter, and the second switching element is coupled between the output terminal of the inductor and the second output terminal of the SIMO power converter; a comparator configured to compare a voltage at the second output terminal with a threshold voltage; and a control circuit configured to detect an overload condition at the first output terminal if a first output current at the first output terminal is larger than a second output current at the second output terminal, and if a sum of the first output current and the second output current exceeds a maximum current limit of the SIMO power converter, to open, in a first step, upon detecting said overload condition at the first output terminal, the first switching element and to close the second switching element by generating corresponding control signals, and to close, in a subsequent, second step, if the voltage at the second output terminal exceeds the threshold voltage, the first switching element and to open the second switching element by generating corresponding control signals.

2. The SIMO power converter of claim 1, wherein the comparator comprises a comparator circuit with hysteresis for performing said comparison between the voltage at the second output terminal and the threshold voltage.

3. The SIMO power converter of claim 1, wherein the control circuit further comprises a multiplexer coupled to a first input of the comparator, wherein the multiplexer is configured to connect the second output terminal to the first input of the comparator in case the overload condition is detected at the first output terminal, or to connect the first output terminal to the first input of the comparator in case an overload condition is detected at the second output terminal, and wherein the threshold voltage is applied to a second input of the comparator.

4. The SIMO power converter of claim 1, wherein the control circuit is configured to generate a first control signal for controlling the switching of the first switching element and to generate a second control signal for controlling the switching of the second switching element, wherein said first control signal and the second control signal are binary signals, and wherein the first control signal is an inverted version of the second control signal.

5. The SIMO power converter of claim 1, further comprising a modulator and a half bridge with a high side switching element and a low side switching element, wherein the modulator is coupled to the half bridge and configured to control the switching behavior of the high side switching element and the low side switching element based on a voltage at the first output terminal and/or the voltage at the second output terminal.

6. The SIMO power converter of claim 5, wherein the control circuit is configured to control the switching of the first switching element and the second switching element independently of the modulator controlling the switching behavior of the high side switching element and the low side switching element.

7. The SIMO power converter of claim 5, wherein the modulator is configured to control the switching of the first switching element and the second switching element when no overload is detected, and wherein the control circuit is configured to control the switching of the first switching element and the second switching element when the overload is detected.

8. The SIMO power converter of claim 1, wherein the control circuit is configured to, when the overload condition is detected at the first output terminal, to increase an average output current through the second switching element by generating corresponding control signals.

9. The SIMO power converter of claim 1, wherein the control circuit is configured to, when the overload condition is detected at the first output terminal, to decrease an average output current through the first switching element by generating corresponding control signals.

10. A method of operating a single inductor multiple output, SIMO, power converter comprising an inductor, a first output terminal, a second output terminal, a first switching element, a second switching element, wherein the first switching element is coupled between an output terminal of the inductor and the first output terminal of the SIMO power converter, and the second switching element is coupled between the output terminal of the inductor and the second output terminal of the SIMO power converter, and a control circuit, the method comprising detecting, by the control circuit, an overload condition at the first output terminal if a first output current at the first output terminal is larger than a second output current at the second output terminal, and if a sum of the first output current and the second output current exceeds a maximum current limit of the SIMO power converter;

generating, based on the detected overload condition, by the control unit, control signals for controlling the switching of the first switching element and the second switching element;

upon detecting said overload condition at the first output terminal, opening the first switching element and closing the second switching element by generating corresponding control signals;

comparing, by a comparator of the control circuit, a voltage at the second output terminal with a threshold voltage; and if the voltage at the second output terminal exceeds the threshold voltage, closing the first switching element and opening the second switching element by generating corresponding control signals.

11. The method of claim 10, further comprising:

providing a multiplexer coupled to a first input of the comparator;

connecting, by the multiplexer, the second output terminal to the first input of the comparator in case the overload condition is detected at the first output terminal;

connecting the first output terminal to the first input of the comparator in case an overload condition is detected at the second output terminal; and applying the threshold voltage to a second input of the comparator.

12. The method of claim 10, further comprising:

generating, by the control circuit, a first control signal for controlling the switching of the first switching element; and generating, by the control circuit, a second control signal for controlling the switching of the second switching element, wherein said first control signal and the second control signal are binary signals, and wherein the first control signal is an inverted version of the second control signal.

13. The method of claim10, further comprising: providing, within the SIMO power converter, a modulator and a half bridge with a high side switching element and a low side switching element;-coupling the modulator to the half bridge; and controlling, by the modulator, the switching behavior of the high side switching element and the low side switching element based on a voltage at the first output terminal and/or the voltage at the second output terminal.

14. The method of claim 13, further comprising:

controlling the switching of the first switching element and the second switching element independently of the switching behavior of the high side switching element and the low side switching element.

15. The method of claim 13, further comprising:

controlling, by the modulator, the switching of the first switching element and the second switching element when no overload is detected;

controlling, by the control circuit, the switching of the first switching element and the second switching element when the overload is detected.

16. The method of claim 10, further comprising:

increasing, when the overload condition is detected at the first output terminal, an average output current through the second switching element by generating corresponding control signals; and decreasing, when the overload condition is detected at the first output terminal, an average output current through the first switching element by generating corresponding control signals.

* * * * *